Aug. 12, 1947.  B. WALKER  2,425,357
APPARATUS FOR EXPLODING LAND MINES
Filed March 16, 1945
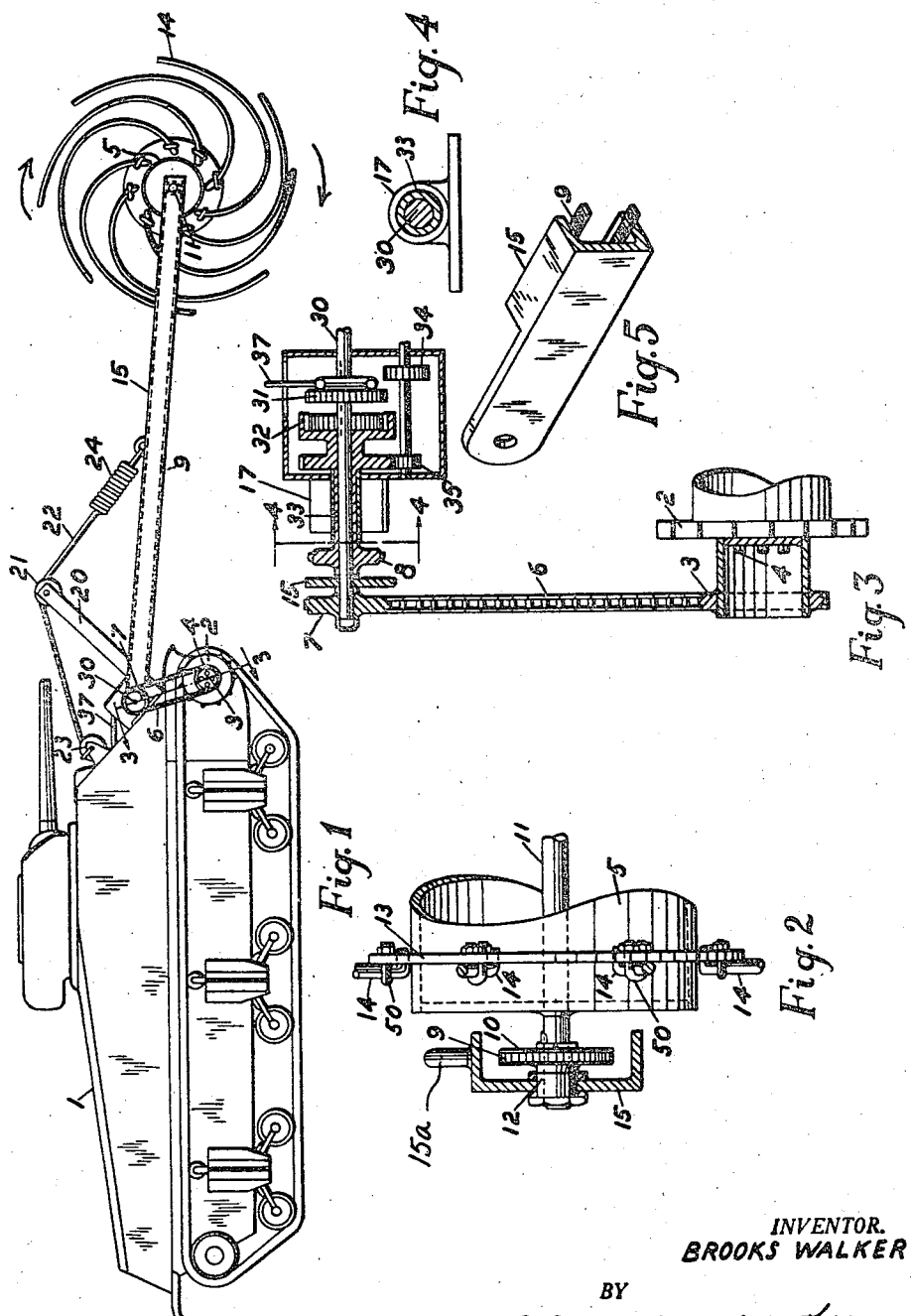
INVENTOR.
BROOKS WALKER
BY
ATTORNEYS / Patented Aug. 12, 1947

2,425,357

UNITED STATES PATENT OFFICE 2,425,357

APPARATUS FOR EXPLODING LAND MINES

Brooks Walker, Piedmont, Calif.

Application March 16, 1945, Serial No. 583,135

2 Claims. (Cl. 89—1)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel apparatus for exploding mines that have been embedded in the earth. This operation is essential, in military operations, before entering captured terrain that has been mined by the enemy.

Devices are being used wherein rotating chains flay the ground. The chains become tangled in barbed wire and other objects. They throw considerable dust and occasionally throw a released mine against the propelling vehicle. Moreover, the assembly must be supported in an elevated position over the ground, since it is not self-supporting.

The objects of the present invention reside in overcoming each of these objections. The specific manner in which they are overcome is set forth hereinafter. In general, the invention embodies a rotating shaft or drum with resilient arms bent at their outer ends. These ends, when brought against the ground, make linear contact therewith. Selected spacing of the arms lengthwise of the shaft or drum assures pressure on each ground strip comparable in width to that of a buried mine. The arms are bent in one direction around the rotating carrier and preferably so that they extend generally in the direction of propulsion when below the center of the carrier. In such case, the carrier must be driven so that the ends of the spring arms making linear contact with the ground move in a direction to help the propulsion of the vehicle while traveling forward rather than oppositely thereto, and the drag of the bent ends on the ground is in the nature of tractive effort propelling the apparatus.

An illustrative embodiment of the invention is disclosed in the following description and the accompanying drawings, in which:

Figure 1 is a side elevational view of my novel mine exploding device;

Figure 2 is a fragmentary view of the end of the drum with parts broken away;

Figure 3 is a view taken on the line 3—3 of Figure 1;

Figure 4 is a view taken on the line 4—4 of Figure 3; and

Figure 5 is a perspective fragmentary view of the end of the supporting member.

Figure 1 is a conventional combat vehicle 1 with driving sprockets 2 on opposite sides of the said vehicle. Each driving sprocket 2 has a spaced sprocket wheel 3 attached laterally thereof by bolts 4. A drum 5 is rotated by the sprockets 2 through sprocket wheels 3, chains 6, sprocket wheels 7, shaft 30, gears 31, gears 32, sleeves 33, sprocket wheels 8, chains 9 and sprocket wheels 10 on the shaft 11 upon which the drum 5 is mounted. Changed gear ratio is obtained by shifting the gears 31 in mesh with gears 34, thereby actuating pinions 35, gears 36, sleeves 33 and sprockets 8. The shifting levers 37 may be operated from inside the vehicle. It will be evident that two sets of gears are provided on each side of the vehicle to assure operation of at least one chain 9, although any form of suitable drive may be used. The shaft 11 is journalled in suitable bearings 12. Circumferentially extending members 13 are disposed on the periphery of the cylinder 5 and have attached thereto by U-bolts 50 curved steel spring members 14 for engaging and beating the ground. Parallel supporting beams 15 having ring member 15a attached thereto, preferably by welding, near the forward end and adjacent the drum 5 are pivotally secured to the shaft 11 and shaft 30 suitably journalled in brackets 17 welded to each side of the tank vehicle. An A frame 20 is pivotally mounted on the front of the tank vehicle 1 and has a pulley 21 for engaging a cable 22 secured to the two beam members 15 and to a drum or winch 23 disposed on the combat vehicle. Springs 24 are disposed in the cable 22 adjacent the beams 15 to permit flexibility of up and down movement of the beams 15 and the drum 5. It will be evident that the spring members 14 may be disposed as shown in Figure 1 or they may be reversed without departing from the spirit of my invention so long as the direction of rotation is in a sense to "wind" rather than "unwind," with the ends of spring members 14 thus making linear contact with the ground whether disposed as in Figure 1 or reversely, but spring members 14 are preferably disposed as in Figure 1 in order that the direction of rotation thereof will as previously stated, help the propulsion of the vehicle while traveling forward. Any form of driving means or supporting means may be used for my novel mine exploder. The spring members 14 support the drum 5 on the ground in an elevated position. The ground pressure of the spring members 14 can be adjusted by raising or lowering the beams 15 by use of the winch 23. The present device does not throw mines into the air.

As distinguished from mine exploders operating through the static weight of heavy rollers or discs bearing on the ground, the present device is of extremely small relative weight and adds little load to the vehicle.

In operation, my novel mine exploder is attached to the forward part of a combat vehicle as shown in Figure 1 of the drawings. In accordance with the softness of the earth upon which mine exploder is operating, the pressure of the spring members on the ground is regulated by adjustment of the cable 22 by means of a winch 23 or lowering the support members 15 through the cable 22 as the case may be. Upon forward motion of the combat vehicle 1, the drum 5 will be rotated through the sprockets 3, chains 6, sprockets 7, sprocket wheels 8, chains 9, sprocket wheels 10 and shaft 11. Any suitable drive may be utilized.

While specific embodiments of the invention have been shown and have been described, it will be understood that various alterations may be made without departure from the spirit of the invention as indicated by the appended claims.

What I claim is:

1. A mine exploder adapted to be attached to a combat vehicle for propulsion by the latter comprising two parallel supporting beams each adapted to be pivotally mounted at one end thereof on said vehicle, a carrier rotatably mounted between the other ends of said beams, a plurality of spaced resilient spring members curved in one direction around said carrier each of said members being attached adjacent one end thereof to said carrier, said members supporting said carrier on the ground in elevated position, outer ends of said members curved to provide linear contact with the ground on rotation of said carrier, said outer ends when below the center of said carrier extending generally in the direction of said propulsion, and means providing drive rotation of said carrier and attached members in a direction aiding said propulsion with the resulting drag of said outer ends in linear contact with the ground being in the nature of tractive propelling effort.

2. In an apparatus for exploding mines embedded in the earth, the combination of a combat vehicle, outwardly extending support beams each pivotally mounted at one end thereof on said vehicle to enable propulsion by the latter, a shaft rotatably disposed between said beams near the other ends of the latter, a drum attached to said shaft for rotation with the latter, a plurality of spaced resilient spring members curved in one direction around said drum, each of said members being attached adjacent one end thereof to said drum for rotation with the latter, said members supporting said drum on the ground in elevated position, outer unattached ends of said members curved to provide linear contact with the ground on rotation of said drum, said outer unattached ends when below the center of said carrier extending generally in the direction of said propulsion by said vehicle, and drive means on said vehicle for drivingly rotating said drum and attached members in a direction aiding said propulsion with the resulting drag of said outer ends in linear contact with the ground being in the nature of tractive propelling effort.

BROOKS WALKER.

REFERENCES CITED

The following references are of record in the file of this patent:

UNITED STATES PATENTS

| Number | Name | Date |
| --- | --- | --- |
| 1,613,997 | Hanson | Jan. 11, 1927 |
| 98,128 | Tull | Dec. 21, 1869 |
| 622,162 | Pattisson | Mar. 28, 1899 |
| 1,939,385 | Burr | Dec. 12, 1933 |
| 2,020,524 | Smithburn | Nov. 12, 1935 |

FOREIGN PATENTS

| Number | Country | Date |
| --- | --- | --- |
| 30,666 | Sweden | May 20, 1910 |
| 205,310 | Great Britain | Oct. 18, 1923 |
| 584,108 | France | Nov. 13, 1924 |

OTHER REFERENCES

Richmond "Times-Dispatch," page 3, June 30, 1944.